Feb. 6, 1945. L. S. WILLIAMS 2,368,626
WEIGHING SCALE
Filed Dec. 13, 1943   2 Sheets-Sheet 1
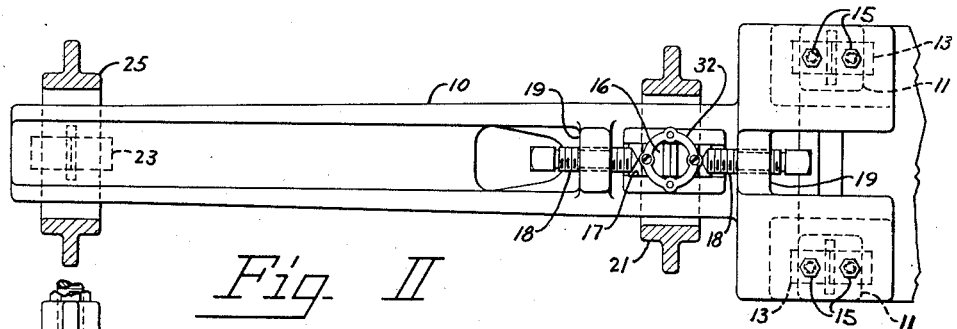
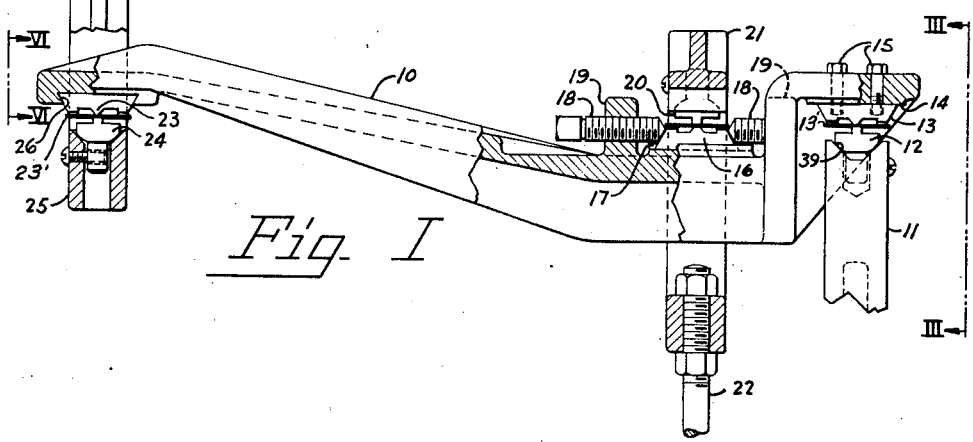
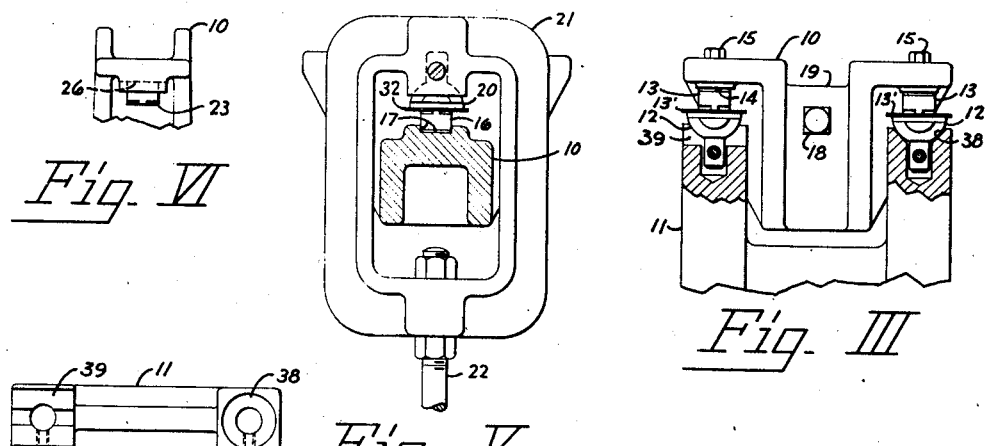
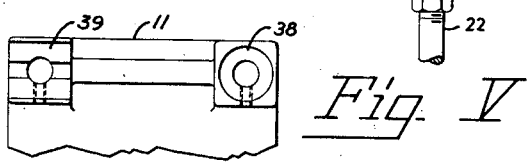
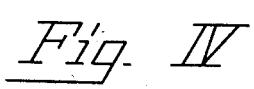
INVENTOR.
Lawrence S. Williams
BY
Marshall & Marshall
ATTORNEYS Feb. 6, 1945.  L. S. WILLIAMS  2,368,626
WEIGHING SCALE
Filed Dec. 13, 1943  2 Sheets-Sheet 2
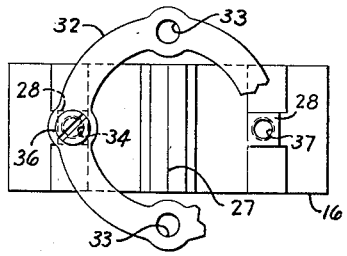
Fig. VIII
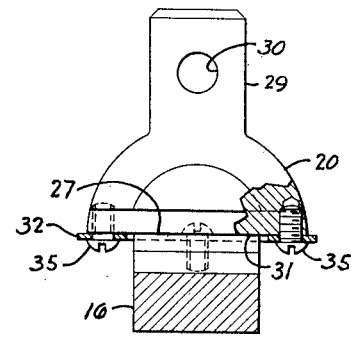
Fig. IX
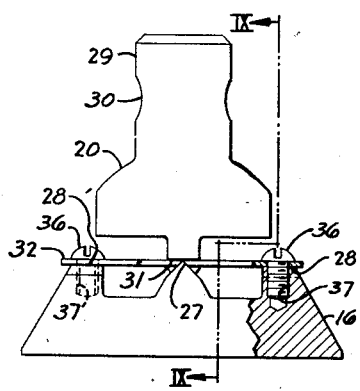
Fig. VII
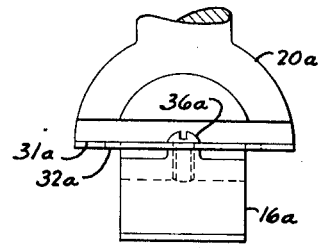
Fig. X
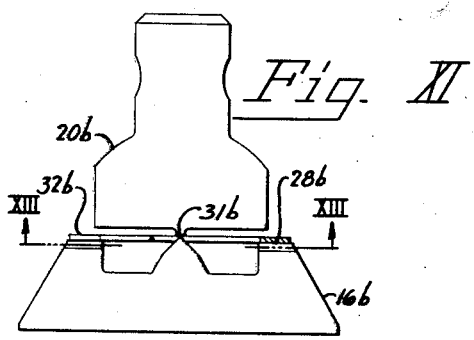
Fig. XI
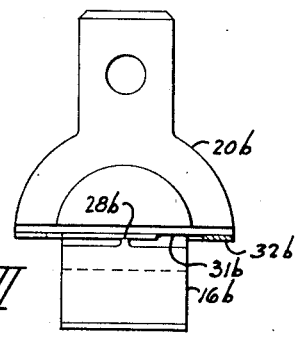
Fig. XII
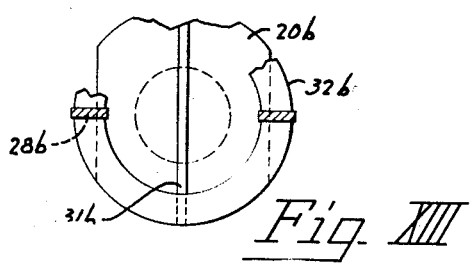
Fig. XIII
INVENTOR.
Lawrence S. Williams
BY
Marshall & Marshall
ATTORNEYS Patented Feb. 6, 1945

2,368,626

UNITED STATES PATENT OFFICE 2,368,626

WEIGHING SCALE

Lawrence S. Williams, Toledo, Ohio, assignor to Toledo Scale Company, Toledo, Ohio, a corporation of New Jersey Application December 13, 1943, Serial No. 513,999

17 Claims. (Cl. 308—2)

This invention relates to weighing scales and in particular to a pivot and bearing assembly for use in a weighing mechanism.

In the construction of weighing scales it is common practice to support the levers by means of knife edges resting in V bearings mounted in the framework of the scale. Similar knife edges in V bearings are employed to transmit forces to and from the levers. This type of construction, while satisfactory for ordinary scales, has certain inherent inaccuracies. While the knife edge in the lever may be made and maintained reasonably sharp the bottom of the V groove must be made comparatively flat. If the V groove is sharp the knife edge tends to seat itself in the sharp V and objectionable friction results. On the other hand, if the V groove is too flat the lever may assume quite a number of different positions depending upon how the knife edge happens to engage the bearing. The shift of the knife edge from one side of the V groove to the other side slightly affects the pivot distances and results in small errors in the weighing. For this reason analytical balances are constructed with knife edges in the lever cooperating with flat bearings in the fulcrum stand and load supporting stirrups. Then to insure against derangement of the parts a relieving gear is provided which definitely positions the lever with respect to the fulcrum stand and the stirrups with respect to the lever before each weighing. In this arrangement the knife edges always engage the bearings along the same line and since the bearings are flat there is no possibility of errors in weighing due to changes in pivot distances.

It is an object of this invention to provide a pivot and bearing construction which provides a flat bearing surface for cooperation with the knife edge but which does not require the elaborate relieving gear to maintain the pivot and bearing in proper position with respect to each other.

Another object of this invention is to provide a flexure plate to maintain a flat bearing in operative relationship with a knife edge.

It is another object of this invention to provide a knife edge and pivot bearing assembly which may be adjustably mounted in a lever.

These, and other objects and advantages will be apparent from the description in which reference is had to the accompanying drawings, illustrating a preferred embodiment of the invention and in which similar reference numerals refer to similar parts throughout the several views.

In the drawings:

Fig. I is a side elevation of a lever assembly incorporating pivots and bearings constructed according to the invention.

Fig. II is a plan of the lever assembly.

Fig. III is an elevation of the fulcrum end of the lever taken from the line III—III of Fig. I.

Fig. IV is a plan of the fulcrum stand with the lever and bearings removed.

Fig. V is a section through the lever showing the load pivot assembly and the load stirrup in elevation.

Fig. VI is an elevation of the power pivot end of the lever taken from the line VI—VI of Fig. I.

Fig. VII is an enlarged elevation of a pivot and bearing assembly with parts broken away to reveal its construction.

Fig. VIII is a fragmentary plan of the knife edge block and flexure plate with the bearing removed.

Fig. IX is a vertical section taken along the line IX—IX of Fig. VII.

Fig. X is an end elevation of a pivot and bearing assembly similar to that shown in Fig. VII except that the flexure plate is welded to one member rather than being clamped with a screw.

Fig. XI is an elevation of a pivot and bearing assembly in which the flexure plate is welded to both the pivot and bearing blocks.

Fig. XII is a side elevation of the pivot and bearing assembly shown in Fig. XI.

Fig. XIII is a fragmentary bottom view of the bearing and flexure plate with the knife edge removed.

These specific drawings and the description which follows is intended to merely disclose and illustrate the invention and not to impose limitations upon the scope of the invention as defined in the claims.

A lever assembly utilizing the improved form of pivot and bearing is shown in Fig. I. A lever 10 is supported on a fulcrum stand 11 by means of knife edge supporting bearings 12 and knife edge blocks 13. The knife edges of the blocks 13 are maintained in proper position on the flats of the bearings 12 by annular flexure plates 13' attached to the bearings 12 in line with the knife edge and to the blocks 13 at points remote from the knife edge. The bearings 12 are located in machined recesses in the top of the fulcrum stand 11. The knife edge blocks 13, of substantially isosceles trapezoidal form, are securely bolted to a machined surface 14 of the lever 10 by means of a pair of screws 15.

The lever 10 is further provided with a load knife edge block 16 adjustably mounted in ways 17 running parallel to the axis of the lever 10. The load knife edge block 16 is securely held by means of a pair of cone pointed adjusting and locking screws 18 threaded through flanges 19 of the lever 10.

A bearing 20 supported in a stirrup 21 transmits force from a steelyard rod 22 to the knife edge block 16. The steelyard rod 22 may support the load directly or be connected to other load supporting levers.

The lever 10 is provided with a power pivot knife edge 23 located in spaced relationship to the knife edge blocks 16 and 13. A bearing 24 held in operative relation with the knife edge 23 by an annular flexure plate 23' is mounted in a stirrup 25 which may be connected to other levers or to a load counterbalancing mechanism.

It will be noted that three methods of attaching the knife edge blocks to the lever are employed. This is to illustrate various forms which may be successfully used. The knife edge block 13 is bolted to the lever 10 by the screws 15. The load knife edge block 16 is adjustably clamped in ways in the lever, while the block including the power pivot 23 is driven into a dovetail notch 26 near the end of the lever 10. It is not necessary that these specific forms of mounting be employed. The only requirement is that the knife edge blocks should be firmly positioned and securely locked against movement during normal operation.

The pivot and bearing construction is shown in detail in Fig. VII. While the load pivot is selected for illustration it is to be understood that the same construction is employed for the fulcrum and power pivots. The knife edge block 16 comprises a knife edge portion 27 and two flat topped surfaces 28 located in a plane slightly below the knife edge 27 and horizontally spaced therefrom. The bearing 20 comprises a shank portion 29 having a transverse drilled hole 30 adapted to be held in a fulcrum stand or stirrup and a flat bearing surface 31 adapted to cooperate with the knife edge 27.

A flexure plate ring 32 is provided to maintain the position of the bearing block 20 with respect to the knife edge block 16. This ring 32 is a thin metallic annulus whose inner diameter is slightly greater than the length of the knife edge 27 and whose outer diameter is approximately equal to the length of the bearing surface 31. This annulus is provided with two sets of holes 33 and 34 located on mutually perpendicular diameters of the annulus. A pair of screws 35 are passed through the holes 33 and are threaded into tapped holes near the ends of the bearing surface 31 thus firmly positioning the annulus 32 with respect to the bearing block 20. Another pair of screws 36 are fitted through the other pair of holes 34 and threaded into tapped holes 37 in the knife edge block 16 thereby clamping the annulus 32 to the flat topped surfaces 28 of the knife edge block 16.

It will be noticed that by this construction the annulus is clamped to the bearing block in line with the knife edge 27 and is clamped to the knife edge block at points widely spaced from the knife edge. This allows rocking motion of the knife edge with respect to the bearing by slightly bending the annulus. Any relative shifting of the bearing block 20 on the knife edge 27 is strongly resisted by the annulus 32.

The metallic annulus may be attached by being welded instead of clamped to the cooperating knife edge block and bearing. One modification is illustrated in Fig. X which shows a metallic annulus 32a clamped to a knife edge block 16a by means of screws 36a and welded to a bearing surface 31a of a bearing block 20a.

In some cases it is desirable that the flexure plate be welded to both members as is illustrated in Figs. XI, XII, and XIII which show a knife edge bearing block 16b having a pair of raised surfaces 28b to which is welded a thin metallic annulus 32b. The annulus 32b is also welded to a flat bearing surface 31b of a bearing block 20b at points which are in line with the knife edge of the knife edge block 16b when it is in cooperative engagement therewith.

For optimum performance of this construction it is desirable that the knife edge line 27 lie in the plane of the neutral axis of the annulus 32. When it is so located there is no tendency for any slipping to occur between the knife edge 27 and the bearing surface 31 which would introduce friction into the weighing mechanism.

In this method of construction there is no end motion allowed between the knife edge and its supporting bearing. Therefore, when two aligned knife edges and bearings are used as in the fulcrum of the lever 10 it is necessary to allow one of the bearings to adjust itself laterally. This is accomplished by mounting one of the bearings 12 in a conical recess 38 and the other of the bearings 12 in a V shaped trough 39. The conical recess 38 definitely positions the lever in both directions while the trough 39 allows the bearing seated therein to assume a natural position without any interference or binding effects.

The mounting and details of this pivot and bearing structure may be modified as may be specifically required without departing from the essence of the invention.

Having described the invention, I claim:

1. In a pivot and bearing assembly, in combination, a bearing adapted to be supported in a stand or stirrup and having a flat bearing surface, a knife-edge block having a knife edge adapted to engage the flat bearing surface and having two flat surfaces substantially coplanar with the knife edge and spaced therefrom, and an annular member attached to the bearing along one of its diameters and to the knife-edge block along another diameter.

2. In a pivot and bearing assembly, in combination, a bearing adapted to be supported in a stand or stirrup and having a flat bearing surface, a knife-edge block having a knife edge adapted to engage the flat bearing surface and having two flat surfaces substantially coplanar with the knife edge and spaced therefrom, and an annular member disposed coplanar with and surrounding the knife edge when on the bearing attached to the bearing along one of its diameters and to the knife-edge block along another diameter.

3. In a pivot and bearing assembly, in combination, a bearing adapted to be supported in a stand or stirrup and having a flat bearing surface, a knife-edge block having a knife edge and a substantially coplanar surface spaced therefrom, and a flexure member attached to the spaced surface of the knife-edge block and to the flat bearing surface of the bearing at points in line with the knife edge when in cooperation therewith.

4. In a device of the class described, in combination, a lever having ways disposed longitudinally of the lever and parallel to the pivot line, a substantially isosceles-trapezoidally shaped block receivable in the ways and having portions of its shorter base removed to form a transverse knife edge and spaced substantially coplanar surfaces, means for engaging the nonparallel sides of the block to adjustably lock it in position in the ways, a bearing having a flat surface to cooperate with the knife edge, and a flexure plate attached to the bearing at points in line with the knife edge when in cooperation therewith and to the spaced coplanar surfaces of the trapezoidal block.

5. In a device of the class described, in combination a substantially trapezoidal block having a transverse knife edge and spaced surfaces substantially coplanar therewith, a bearing block adapted to be supported in a stand or stirrup and having a raised flat surface for cooperation with the knife edge, and a thin metallic annulus clamped to the raised flat surface of the bearing at points in line with the knife edge when in cooperation therewith and clamped to the trapezoidal block at points remote from the knife edge.

6. In a device of the class described, in combination, a substantially trapezoidal block having a transverse knife edge and spaced surfaces substantially coplanar therewith, a bearing block adapted to be supported in a stand or stirrup and having a raised flat surface for cooperation with the knife edge, and a thin metallic annulus welded to the raised flat surface of the bearing at points in line with the knife edge when in cooperation therewith and welded to the trapezoidal block at points remote from the knife edge.

7. In a device of the class described, in combination, a substantially trapezoidal block having a transverse knife edge and spaced surfaces substantially coplanar therewith, a bearing block adapted to be supported in a stand or stirrup and having a raised flat surface for cooperation with the knife edge, and a thin metallic annulus welded to the raised flat surface of the bearing at points in line with the knife edge when in cooperation therewith and clamped to the trapezoidal block at points remote from the knife edge.

8. In a pivot and bearing assembly, in combination, a bearing adapted to be supported in a stand or stirrup and having a flat bearing surface, a knife-edge block having a knife edge adapted to engage the flat bearing surface and having two flat surfaces substantially coplanar with the knife edge and spaced therefrom, and a flexible annular member rigidly connected to the bearing along one of its diameters and to the knife-edge block along another diameter.

9. In a pivot and bearing assembly, in combination, a bearing adapted to be supported in a stand or stirrup and having a flat bearing surface, a knife-edge block having a knife edge adapted to engage the flat bearing surface and having two flat surfaces substantially coplanar with the knife edge and spaced therefrom, and a flexible annular member disposed coplanar with and surrounding the knife edge when on the bearing rigidly connected to the bearing along one of its diameters and to the knife-edge block along another diameter.

10. In a pivot and bearing assembly, in combination, a bearing adapted to be supported in a stand or stirrup and having a flat bearing surface, a knife-edge block having a knife edge and substantially coplanar surfaces spaced therefrom, and a flexure member rigidly connected to the spaced surfaces of the knife-edge block and to the flat bearing surface of the bearing at points in line with the knife edge when in cooperation therewith.

11. In a device of the class described, in combination, a lever having ways disposed longitudinally of the lever and parallel to the pivot line, a substantially isosceles-trapezoidally shaped block receivable in the ways and having portions of its shorter base removed to form a transverse knife edge and spaced substantially coplanar surfaces, means for engaging the nonparallel sides of the block to adjustably lock it in position in the ways, a bearing having a flat surface to cooperate with the knife edge, and a flexure plate rigidly connected to the bearing at points in line with the knife edge when in cooperation therewith and to the spaced coplanar surfaces of the trapezoidal block.

12. In a device of the class described, in combination, a substantially trapezoidal block having a transverse knife edge and spaced surfaces substantially coplanar therewith, a bearing block adapted to be supported in a stand or stirrup and having a raised flat surface for cooperation with the knife edge, and a thin metallic annulus rigidly connected to the raised flat surface of the bearing at points in line with the knife edge when in cooperation therewith and clamped to the trapezoidal block at points remote from the knife edge.

13. In a pivot and bearing assembly, in combination, a bearing adapted to be supported in a stand or stirrup and having a flat bearing surface, a knife-edge block having a knife edge adapted to engage the flat bearing surface and having two flat surfaces substantially coplanar with the knife edge and spaced therefrom, and a flexible annular member fastened to the bearing along one of its diameters and to the knife-edge block along another diameter.

14. In a pivot and bearing assembly, in combination, a bearing adapted to be supported in a stand or stirrup and having a flat bearing surface, a knife-edge block having a knife edge adapted to engage the flat bearing surface and having two flat surfaces substantially coplanar with the knife edge and spaced therefrom, and a flexible annular member disposed coplanar with and surrounding the knife edge when on the bearing fastened to the bearing along one of its diameters and to the knife-edge block along another diameter.

15. In a pivot and bearing assembly, in combination, a bearing adapted to be supported in a stand or stirrup and having a flat bearing surface, a knife-edge block having a knife edge and substantially coplanar surfaces spaced therefrom, and a flexure member fastened to the spaced surfaces of the knife-edge block and to the flat bearing surface of the bearing at points in line with the knife edge when in cooperation therewith.

16. In a device of the class described, in combination, a lever having ways disposed longitudinally of the lever and parallel to the pivot line, a substantially isosceles-trapezoidally shaped block receivable in the ways and having portions of its shorter base removed to form a transverse knife edge and spaced substantially coplanar surfaces, means for engaging the nonparallel sides of the block to adjustably lock it in position in the ways, a bearing having a flat surface to cooperate with the knife edge, and a flexure plate fastened to the bearing at points in line with the knife edge when in cooperation therewith and to the spaced coplanar surfaces of the trapezoidal block.

17. In a device of the class described, in combination, a substantially trapezoidal block having a transverse knife edge and spaced surfaces substantially coplanar therewith, a bearing block adapted to be supported in a stand or stirrup and having a raised flat surface for cooperation with the knife edge, and a thin metallic annulus fastened to the raised flat surface of the bearing at points in line with the knife edge when in cooperation therewith and clamped to the trapezoidal block at points remote from the knife edge.

LAWRENCE S. WILLIAMS.